(12) United States Patent
Huang

(10) Patent No.: US 7,177,238 B2
(45) Date of Patent: Feb. 13, 2007

(54) METHOD AND RELATED APPARATUS FOR ADAPTING ROTATION SPEED ADJUSTMENTS OF A MOTOR VIA A PAUSE MODE WHILE ACCESSING DATA FROM AN OPTICAL DISC

(75) Inventor: Umi Huang, Taipei Hsien (TW)

(73) Assignee: VIA Technologies Inc., Taipei Hsien (TW)

( * ) Notice: Subject to any disclaimer, the term of this patent is extended or adjusted under 35 U.S.C. 154(b) by 616 days.

(21) Appl. No.: 10/605,940

(22) Filed: Nov. 6, 2003

(65) Prior Publication Data

US 2004/0109394 A1    Jun. 10, 2004

(30) Foreign Application Priority Data

Nov. 7, 2002  (TW) ............................... 91132829 A

(51) Int. Cl.
*G11B 7/085* (2006.01)
(52) U.S. Cl. ................................ 369/30.16; 369/30.17; 369/267

(58) Field of Classification Search ............. 369/30.16, 369/30.17, 30.15, 30.1, 30.11, 47.4, 267, 369/13.02, 19, 44.29
See application file for complete search history.

(56) References Cited

U.S. PATENT DOCUMENTS

| | | | |
|---|---|---|---|
| 5,265,077 A | 11/1993 | Yoshimoto et al. | |
| 5,477,522 A | 12/1995 | Kim | |
| 5,894,459 A * | 4/1999 | Kurita et al. | 369/13.02 |
| 7,092,322 B2 * | 8/2006 | Kadlec et al. | 369/44.29 |

* cited by examiner

*Primary Examiner*—Ali Neyzari
(74) *Attorney, Agent, or Firm*—Winston Hsu

(57) ABSTRACT

A method and related apparatus for data accessing of an optical disk drive. The optical disk drive has a motor for rotating an optical disk and a pickup head. The pickup head is capable of writing data onto the optical disk according to a write-in clock. The method includes: when the pick-up head is seeking to a target position and a rotation speed of the motor is still being adjusted and unstable, making the pickup head slide back and forth within a predefined range, and making the pickup head slide toward the target position when the rotation speed of the motor becomes stable.

16 Claims, 9 Drawing Sheets

METHOD AND RELATED APPARATUS FOR ADAPTING ROTATION SPEED ADJUSTMENTS OF A MOTOR VIA A PAUSE MODE WHILE ACCESSING DATA FROM AN OPTICAL DISC

BACKGROUND OF INVENTION

1. Field of the Invention

The present invention provides a method for accessing data by controlling an optical disc drive and related apparatus, more particularly, to a method that accesses data by performing a pause state to adapt to a change of time for stabilizing a rotational speed of a motor in the optical disc drive and related apparatus.

2. Description of the Prior Art

Optical discs having small size, low cost, and large memory capacity for recording electronic data and information have become one of the most important memory mediums. The development of recordable optical discs has made the optical disc become one of the most important nonvolatile memory mediums. As a user must use an optical disc drive to access data on the optical disc, optical disc drive technology has become one of the major research topics for industry, with the aim of making optical disc drive data access more correct and efficient.

FIG. 1 is a functional diagram of an optical disc drive 10 according to the prior art. The optical disc drive 10 comprises a motor 12, a sliding track 14 fixed to the optical disc 22, a pickup head 16 for accessing data on the optical disc 22, a drive circuit 20, and a control circuit 18. The motor 12 is used to drive an optical disc 22, and the control circuit 18 is used to control the optical disc drive 10. The optical disc 22 comprises a track 24 around the center of the optical disc 22 used to record data, and the track 24 can be divided into a plurality of tracks along a radial line (DO shown in FIG. 1) of the optical disc 22. For example, a track 28A and a track 28B next to the track 28A are on the outer circle, and a track 28C is on the inner circle. The sliding track 14 is fixed along the radial line DO of the optical disc 22, and the pickup head 16, sliceable along the sliding track 14, can slide in both directions along the sliding track 14 so as to access data on the optical disc 22. The pickup head 16 generates a laser to a lower surface 26 of the optical disc 22, and the optical disc drive 10 analyzes the data recorded on the optical disc 22 according to the laser reflected to the pickup head 16. In the recordable optical disc drive, a laser generated by the pickup head 16 to record data onto the tracks 24 is also used. When the motor 12 drives the optical disc 22, the tracks on the optical disc 22 pass by the pickup head 16 as the optical disc 22 rotates. To access data on different tracks, the pickup head 16 slides along the sliding track 16 to different positions according to the different tracks.

The control circuit 18 controls the sliding of the pickup head 16, and receives the data read by the pickup head 16. In a recordable optical disc drive, the control circuit 18 also records data onto the optical disc 22 with the pickup head 16. In addition, the control circuit 18 outputs a drive signal 34 to the drive circuit 20, and the drive circuit 20 transfers the drive signal 34 to a corresponding signal that controls the rotational speed of the motor 12, then the motor 12 adjusts the rotational speed according to the corresponding signal outputted by the drive circuit 20.

Because data is recorded on the optical disc with great density, it is necessary to coordinate performance of the mechanical and electronic apparatuses in the optical disc drive 10 before it accesses the data on the optical disc 22, and especially before it records data onto the optical disc 22. Furthermore, due to a special coding of the data recorded on the optical disc, even if the operation of the electronic apparatus is not perfect and reads a certain part of the data incorrectly, the optical disc drive 10 performs functions of error checking and recovery so as to analyze erroneous parts of the data according other parts of the data.

To control the optical disc drive 10 to record data onto the optical disc 22, the recordable optical disc is specially designed to assist the coordination between mechanical and electronic apparatus while the optical disc drive 10 records data onto the recordable optical disc. Refer to FIG. 2 and FIG. 3. FIG. 2 and FIG. 3 are structure diagrams of a recordable optical disc. As shown in FIG. 2, the optical disc comprises the track 24 around the center of the optical disc 22, and on the recordable optical disc, the track 24 is formed with a data track 30A and wobble tracks 30B distributed on both sides of the data track 30A (as shown in region 1A of FIG. 2). The data track 30A and lines 33 of the wobble tracks 30B spiral around the center of the optical disc 22. As shown in region 1A of FIG. 2, the wobble tracks 30B periodically differ from the lines 33 in two regions WT1 And WT2 having different lengths. Refer to region 1B of FIG. 2 and FIG. 3, which is the three-dimensional structure of region 1B, the data track 30A is for recording data along discontinues spreading recording marks 32 (pits, for example) with different lengths, the wobble tracks 30B being formed with a continuous spreading pre-groove. When the track 24 passes the pickup head, the pickup head accesses data on the data track 30A and sweeps the pre-groove along the lines 33 of the wobble tracks 30B at the same time. As shown in FIG. 3, because the intensities of lasers reflected from high parts and low parts of the pre-groove are different, when the pickup head 16 passes over the pre-groove along the lines 33 of the wobble tracks, it reads out signals with different intensities according to the reflected lasers. The cycle of of strong signals and weak signals is related to the lengths of the regions WT1 And WT2. The optical disc 22 is used to code and record wobble data onto the wobble tracks 30B according to different lengths of the regions WT1 And WT2. The optical disc drive 10 analyzes the laser signals reflected from the pre-groove so as to read out the wobble data recorded on the wobble tracks 30B from the cycle of strong signals and weak signals.

The data track of a recordable optical disc is used for recording user data, and the wobble data on the wobble tracks is used to record data related to standard of data on the optical disc 22. For example, the wobble data on the wobble tracks is used to record positions of a plurality of frames, which divide the tracks 24 and are used to record certain data, so as to assist the optical disc drive 10 to correctly record data onto corresponding frames. The data track on a blank recordable optical disc does not initially record with any data, thus, it is necessary for the optical disc drive 10 to read the standard of data from the wobble data recorded on the wobble tracks. When the data track does have recorded data, while the optical disc drive records new data onto the data track, it still has to read the standard of data from the wobble data so as to record new data onto correct frames. When the optical disc drive 10 needs to record data onto certain frame, it has to know the position of the frame and generate a recording clock synchronized with the frame according to the wobble data so as to control the pickup head to record each byte of the data onto the frame. On the data track, the different lengths of the recording marks represent different numbers of bytes. To correctly represent corresponding number of bytes with recording marks with proper lengths, the optical disc drive 10 determines how long the pickup head 16 remains emitting recording laser based on the recording clock. Once the recording clock is synchronized with frames defined by the wobble data, the optical disc drive 10 can record each byte of data with proper length onto the corresponding frame.

As stated previously, it is necessary to coordinate performances of mechanical and electronic apparatuses in the optical disc drive 10 before it accesses the data on the optical disc 22. For example, while a rotational speed of the motor is higher and makes a certain frame pass the pickup head with a higher linear velocity, the optical disc drive 10 controls the pickup head 16 accordingly to output a recording clock with a higher frequency so as to record data onto the frame correctly. To access data on the optical disc 22 smoothly, the optical disc drive 10 coordinates operation of mechanical and electronic apparatuses under a certain procedure. Refer to FIG. 4. FIG. 4 is a flowchart of mechanical and electrical coordination procedure 100 before the optical disc drive 10 begins to record data. The procedure 100 is especially suitable for an optical disc drive operating under a constant linear velocity. The optical disc drive operating under a constant linear velocity controls tracks on the inner circle (ex. 28A and 28B of FIG. 1) and on the outer circle (ex. 28C of FIG. 1) to move past the pickup head 16 with same linear velocity. Therefore, the rotational speed of the motor 12 is faster as the pickup head 16 is accessing tracks on the inner circle (ex. 28C of FIG. 1), and the rotational speed of the motor 12 is slower as the pickup head 16 is accessing tracks on the outer circle (ex. 28A of FIG. 1) so as to control tracks on the inner circle and on the outer circle to pass the pickup head 16 with same linear velocity. Because tracks on the inner circle and on the outer circle pass the pickup head 16 with the same linear velocity, the optical disc drive 10 operating under a constant linear velocity accesses data on different tracks with the same transmission rate. Therefore, it is more stable to access data and more correct to read/record data. On the contrary, the mechanical and electronic coordination procedure of the prior art is more complex because the rotational speed of the motor 12 has to change while data on different tracks are accessed under a constant linear velocity. As shown in FIG. 4, the procedure 100 of the prior art comprises:

Step 102: Start to trace tracks for recording data. Before a user controls the optical disc drive to slide the optical pickup head 16 to a position (called the "target position" hereafter) corresponding to a certain site on the track 24 and record data onto the optical disc 22, the user can perform tests, such as pre-recording data onto the inner area of the optical disc.

Step 104: As stated previously, the rotational speed of the motor 12 has to change while data on different tracks are accessed under a constant linear velocity. After determining the certain site for recording data, the motor 12 starts to adjust the rotational speed according to a rotational speed corresponding to the track where the certain site located. Meanwhile, the pickup head 16 remains moving toward the target position corresponding to the certain site. While the motor 12 adjusts the rotational speed, the control circuit 18 monitors stability of the rotational speed of the motor 12. If the rotational speed is stable then execute step 106, if the rotational speed is unstable then repeat step 104 until the rotational speed becomes stable. According to the prior art, the optical disc drive 10 starts to adjust the rotational speed of the motor 12 when there is a predetermined distance between the pickup head 16 and the target position, then repeats step 104 to check if the rotational speed of the motor has becomes stable. The control circuit 18 determines the rotational speed of the motor 12 with the drive signal 34 outputted to the drive circuit 20 by the control circuit 18.

Step 106: Start to synchronize the recording clock with the wobble data. As stated previously, the recording clock has to synchronize with the frame defined by the wobble data so as to record data onto the optical disc 22 correctly. After the rotational speed of the motor 12 is stable, the optical disc drive 10 adjusts a frequency of the recording clock according to the wobble data read from the optical disc 22 so as to remain synchronizing the recording clock with the wobble data. Before executing step 108, repeat step 106 until the recording clock has synchronized with the frame defined by the wobble data. Meanwhile, the pickup head 16 remains moving toward the target position.

Step 108: Examine if the pickup head 16 overtakes the target position. If it does not, execute step 110, and if it does, slide the pickup head 16 backward and repeat steps 102, 104, and 106.

Step 110: Start to record data onto tracks of the optical disc 22 corresponding to the target position with the pickup head 16.

Refer to FIG. 5. FIG. 5 is a diagram of position of the pickup head 16 on the sliding track 14 and sequence of related signals when executing the steps shown in FIG. 4. Region 5A of FIG. 5 shows different positions of the pickup head 16 on the sliding track 14 at different times, the horizontal direction representing the position of the pickup head. A wave pattern 37 and a wave pattern 34 of FIG. 5 separately represent a wave pattern of tracking error and a wave pattern of drive signal 34, horizontal direction of the two wave patterns representing time, the vertical direction of the two wave patterns representing intensity of signal. The wave pattern 37 of tracking error represents how many tracks the pickup head 16 has crossed, for example, a period T0 of FIG. 5 represents that the pickup head 16 has crossed a track. As stated previously, the control circuit 18 of FIG. 1 controls the drive circuit 20 to change the rotational speed of the motor 12 with the drive signal 34, and changes the intensity of the drive signal 34 to adjust the rotational speed of the motor 12 according to the read-out data from the pickup head 16. Therefore, the wave pattern of drive signal 34 can represent the rotational speed of the motor 12.

Assuming a position of the pickup head 16 on the sliding track 14 is a position Pp0 (shown in FIG. 5) corresponding to the track 28C of FIG. 1 when executing step 102, a user outputs a recording instruction to the optical disc drive 10 to record data onto the track 28B corresponding to a position Pp3 (a target position) on the sliding track 14 through a computer. After receiving the recording instruction, the optical disc drive 10 starts to control the pickup head 16 to slide from the position Pp0 to the position Pp3. According to the procedure 100 of the prior art, the optical disc drive 10 begins to execute step 104 and step 106 when there is a predetermined distance between the pickup head 16 and the target position. In this case, the predetermined distance is D0. According to the target position Pp3 and the predetermined distance D0, the optical disc drive 10 determines a beginning position Pp1 where it begins to execute step 104 and 106. During executing step 102, the optical disc drive 10 controls the pickup head 16 to slide from the position Pp0 to the beginning position Pp1. The pickup head 16 performs a long distance track crossing when the distance between the position Pp0 and the beginning position Pp1 is longer, thus, the wave pattern 37 of tracking error is more concentrated during a period Tp1. Then, the pickup head 16 performs a short distance track crossing during a period Tp2. Finally, the pickup head 16 performs track crossing between several tracks to slightly adjust its position before it has arrived at the beginning position to complete step 102, and starts to execute step 104 from the beginning position Pp1.

The rotational speed of the motor 12 varies to access data on different tracks with the optical disc drive 10 operating under a constant linear velocity. While executing step 102, the rotational speed of the motor 12 corresponds to the track 28C and is relatively fast, and while the optical disc drive 10 records data onto the track 28B, the rotational speed of the motor 12 changes to a corresponding slower speed. When adjusting the rotational speed of the motor 12 during step 104, the pickup head 16 remains moving toward the target position Pp3. As shown in the wave pattern 34, the control circuit 18 changes the drive signal 34 to reduce the rotational speed of the motor 12 so as to change the rotational speed of the motor 12 to the rotational speed of the track corresponding to the target position Pp3. Because the control circuit 18 adjusts the drive signal 34 according to the data read from the pickup head 16, when the rotational speed of the motor 12 is not stable, the drive signal 34 changes to compensate the change of the rotational speed of the motor 12. The optical disc drive 10 determines a predetermined range, such as a range between L1 and L2 of FIG. 5. When the wave pattern of the drive signal 34 remains within the range between L1 and L2, a change of the rotational speed of the motor 12 is close to a tolerant range of speed corresponding to the target position, and thus, the rotational speed of the motor 12 stably changes to a rotational speed corresponding to the target position (the purpose of step 104).

When executing step 104, the predetermined distance D0 is divided into two predetermined distances D1 and D2. The predetermined distance D1 is for executing step 104 when the motor 12 stably changes to the rotational speed corresponding to the target position Pp3, and the predetermined distance D2 is for executing step 106. During the period the pickup head 12 slides from the beginning position Pp1 to the position Pp2 for the predetermined distance D1, the optical disc drive 10 executes step 104 at the same time. If the rotational speed of the motor 12 becomes stable when the pickup head 12 has slid to the position Pp2, the pickup head 12 begins to execute step 106 from the position Pp2. As shown in FIG. 5, because the pickup head 12 slides smoothly along the track 24 toward the position Pp2 during the period Tp4 of sliding from the beginning position Pp1 to the position Pp2, the wave pattern 37 remains straight and no track is crossed, and the wave pattern of the drive signal 34 changes to remain in the range between L1 and L2.

After the rotational speed of the motor 12 has become stable, the optical disc drive 10 executes step 106 and adjusts the frequency of the recording clock according to the wobble data read out from the optical disc 22 so as to synchronize the recording clock with the wobble data during the period when the pickup head 12 slides from the position Pp2 to the target position Pp3. When the optical disc 22 synchronizes the recording clock with the wobble data as the pickup head 12 arrives at the target position Pp3, the step 106 is successfully executed. Hereafter, the optical disc drive 10 executes step 108 and step 110, and starts to record data onto the target position Pp3 of the optical disc 22 when executing step 110.

The procedure 100 according to the prior art provides the optical disc drive 10 with predetermined distances D1 and D2 for giving more time to the optical disc drive 10 to adjust the rotational speed of the motor 12 and synchronize the recording clock with the wobble data. Generally speaking, the lengths of the predetermined distances D1 and D2 are determined according to a pre-written program of the control circuit 18. It is simple to predict the time for synchronizing during step 106 and the length of the predetermined distance D2, because synchronizing is only about the performance of the electronic apparatus when executing step 106. On the contrary, the time for stabilizing the rotational speed of the motor 12 varies significantly during step 104, so it is difficult to predict and set the length of the predetermined distance D1. This is especially so recently, as electronic apparatuses (ex. control circuit 18) and mechanical apparatuses (ex. motor 12) of optical disc drives are mainly produced at different factories. It is more difficult for the factories that produce the electronic apparatus to estimate the predetermined distance. If the rotational speed of the motor 12 is not stable after the pickup head 16 has slid the predetermined distance D1, the optical disc drive 10 continues to execute step 104 though the pickup head 16 has overtaken the position Pp2 until the rotational speed of the motor 12 becomes stable. Therefore, step 106 is delayed, and the pickup head 16 has overtaken the target position Pp3 when the optical disc drive 10 has completed step 106, thus, the pickup head 16 has to slide backward and repeat steps 102,104, and 106.

Refer to FIG. 6, which is similar to FIG. 5. As shown in FIG. 6, the pickup head 16 is assumed to slide from a position Pp0 to a target position Pp3 for recording data while executing step 102. Likewise, the optical disc drive 10 determines a beginning position Pp1 based on the target position Pp3 and predetermined distances D1 and D2. During step 102, the pickup head 16 crosses tracks to the beginning position Pp1 after it goes through a period Tp1 to a period Tp3. The optical disc drive 10 executes step 104 as the pickup head 16 starts to slide from the beginning position Pp1. However, a wave pattern of the drive signal 34 still exceeds a range of a tolerant value between L1 and L2 if the rotational speed of the motor 12 is not stable after the pickup head 16 has slid the distance D1 and arrived at the position Pp2 (as shown in FIG. 6). Then, the optical disc drive 10 continues to execute step 104, and the pickup head 16 will overtake the position Pp2 and continue to slide toward the target position Pp3. If the rotational speed of the motor 12 is not stable until the pickup head 16 has slid to a position Pp4, the pickup head 16 continues to slide until step 106 and wait until the control circuit 18 has synchronized the recording clock with the wobble data at the same time. Because the optical disc drive 10 cannot complete step 104 during the period when the pickup head 16 slides for the predetermined distance D1, the pickup head slides a distance longer than the predetermined distance D1 and arrives at a position Pp4 when the optical disc drive 10 has completed step 104. Due to the delay of step 104, the pickup head 16 overtakes the target position Pp3 and arrives at a position Pp5 when the optical disc drive 10 has completed step 106 during a period Tp5. The optical disc drive 10 determines that the position of the pickup head 16 has overtaken the target position Pp3 during step 108. Then, the optical disc drive 10 performs a long distance track crossing and a short distance track crossing, and slightly adjusts the position of the pickup head 16 so as to slide the pickup head 16 to a position Pp6 before the target position Pp3. Again, the optical disc drive 10 repeats step 104 and 106 during the period when the pickup head 16 slides from the position Pp6 to the target position Pp3.

According to the prior art, the optical disc drive 10 cannot complete step 104 during the period when the pickup head 16 slides for the predetermined distance D1, and wastes significant amounts of time to trace tracks, stabilize the rotational speed of the motor 12, and synchronize the recording clock with the wobble data. Therefore, the length of the predetermined distance D1 has to be long enough so as to complete step 104 once. However, as stated previously, the time for stabilizing the rotational speed of the motor 12 varies substantially during step 104, so it is difficult to predict and set the length of the predetermined distance D1. Thus, to make sure the length of the predetermined distance D1 is long enough, the length of the predetermined distance D1 is extended as long as possible. However, the actual time (the time "t0" shown in FIG. 5) for completing step 104 might be much shorter than the time (the position "Pp2" shown in FIG. 5) for the pickup head 16 to finish the predetermined distance D1 hereafter, and the optical disc drive 10 wastes time sliding for the predetermined distance D1 before it executes step 106. On the other hand, if the length of the predetermined distance D1 is too short, the optical disc drives 10 wastes more time because the pickup head 16 overtakes the target position.

SUMMARY OF INVENTION

It is therefore a primary objective of the claimed invention to provide a method for adapting to a change of time for stabilizing a rotational speed of a motor by performing a pause state and related apparatus to solve the above-mentioned problems.

According to the claimed invention, a pickup head is slid back and forth in a pause state until a rotational speed of a motor becomes stable, then, the pickup head is slid toward a target position where data is recorded. During the period when the rotational speed of the motor is adjusted, the pickup head slides back and forth only in a range of several tracks, thus, the pickup head will not overtake the target position during the following steps even when it takes more time to adjust the rotational speed of the motor. According to the claimed invention, once the rotational speed of the motor has become stable, an optical disc drive starts to synchronize the recording clock with the wobble data. No matter how long it takes to adjust the rotational speed of the motor, the optical disc drive adapts to this and performs mechanical and electronic coordination with more efficiency so as to ensure that the data will be correctly accessed.

These and other objectives of the claimed invention will no doubt obvious to those of ordinary skill in the art after reading the following detailed description of the preferred embodiment that is illustrated in the various figures and drawings.

DETAILED DESCRIPTION

Figure 1:
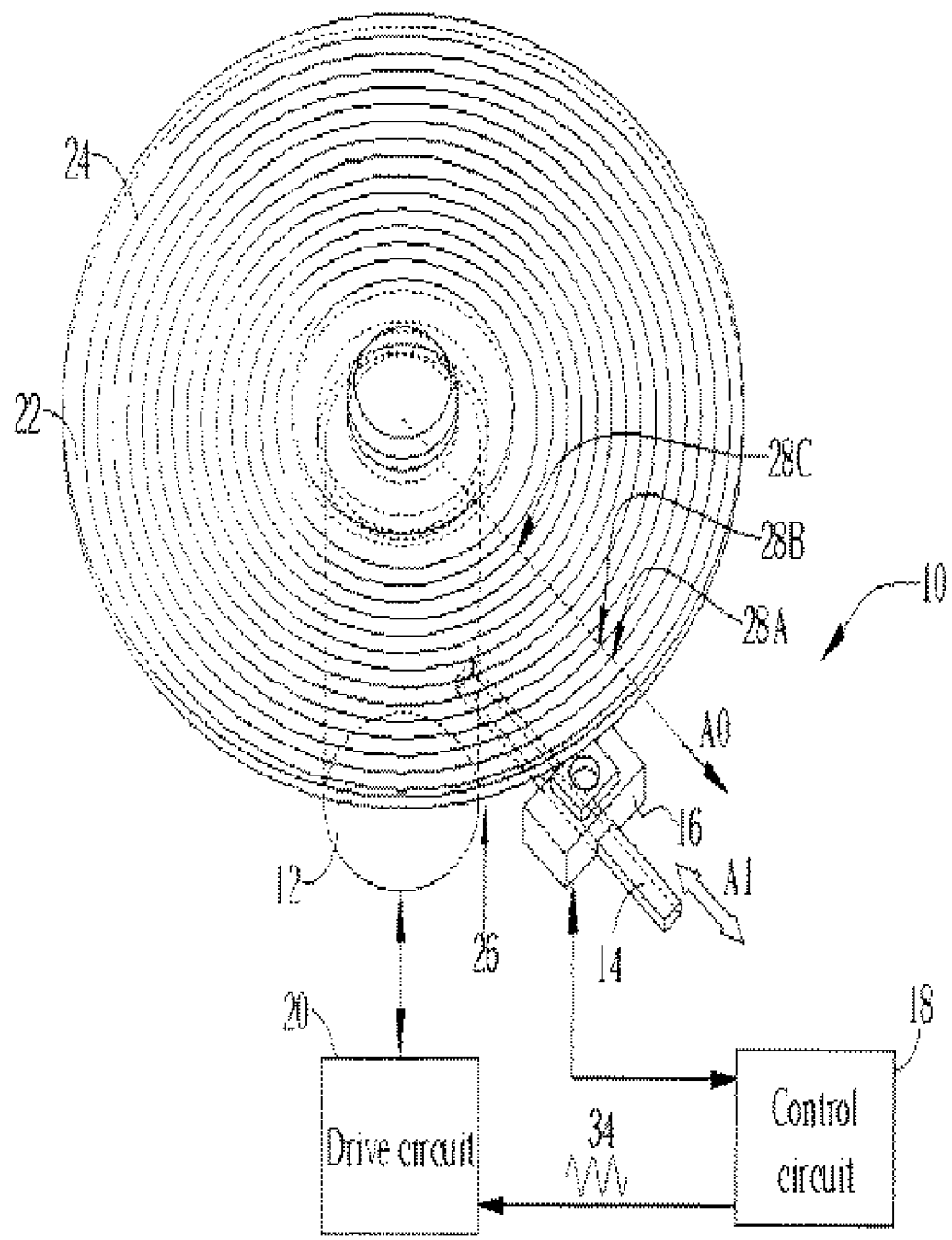
FIG. 1 is a functional diagram of an optical disc drive according to the prior art.
Figure 2:
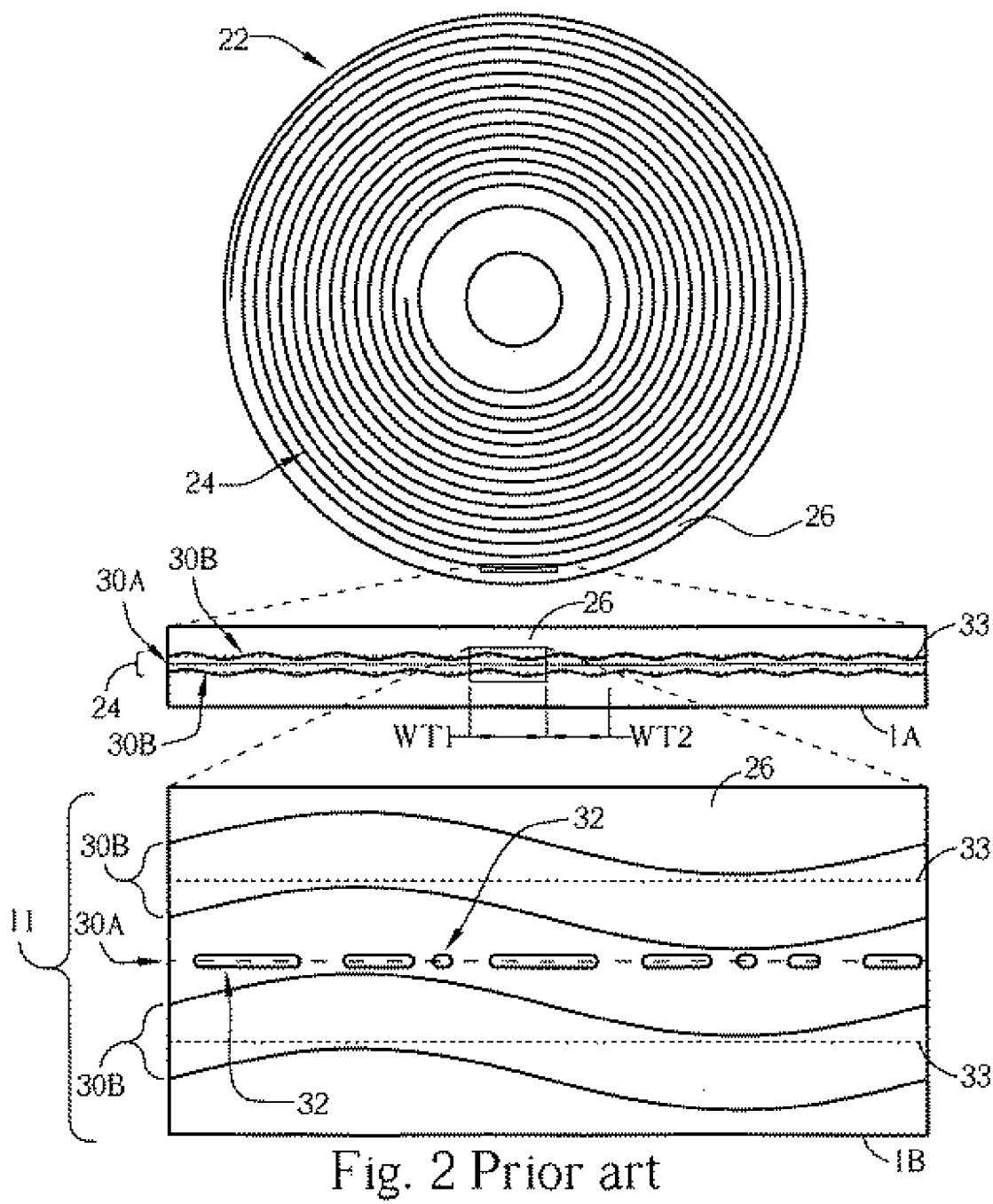
FIG. 2 and FIG. 3 are structure diagrams of a recordable optical disc.
Figure 3:
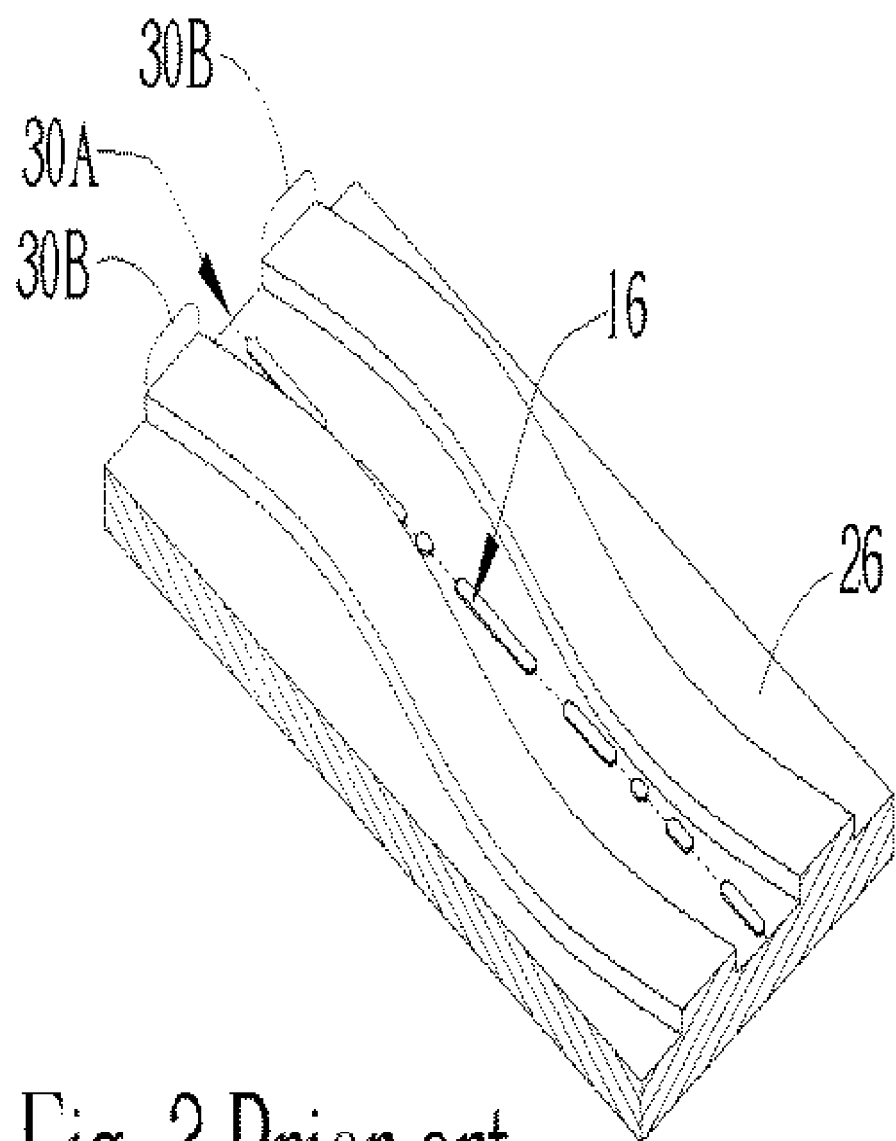
Figure 4:
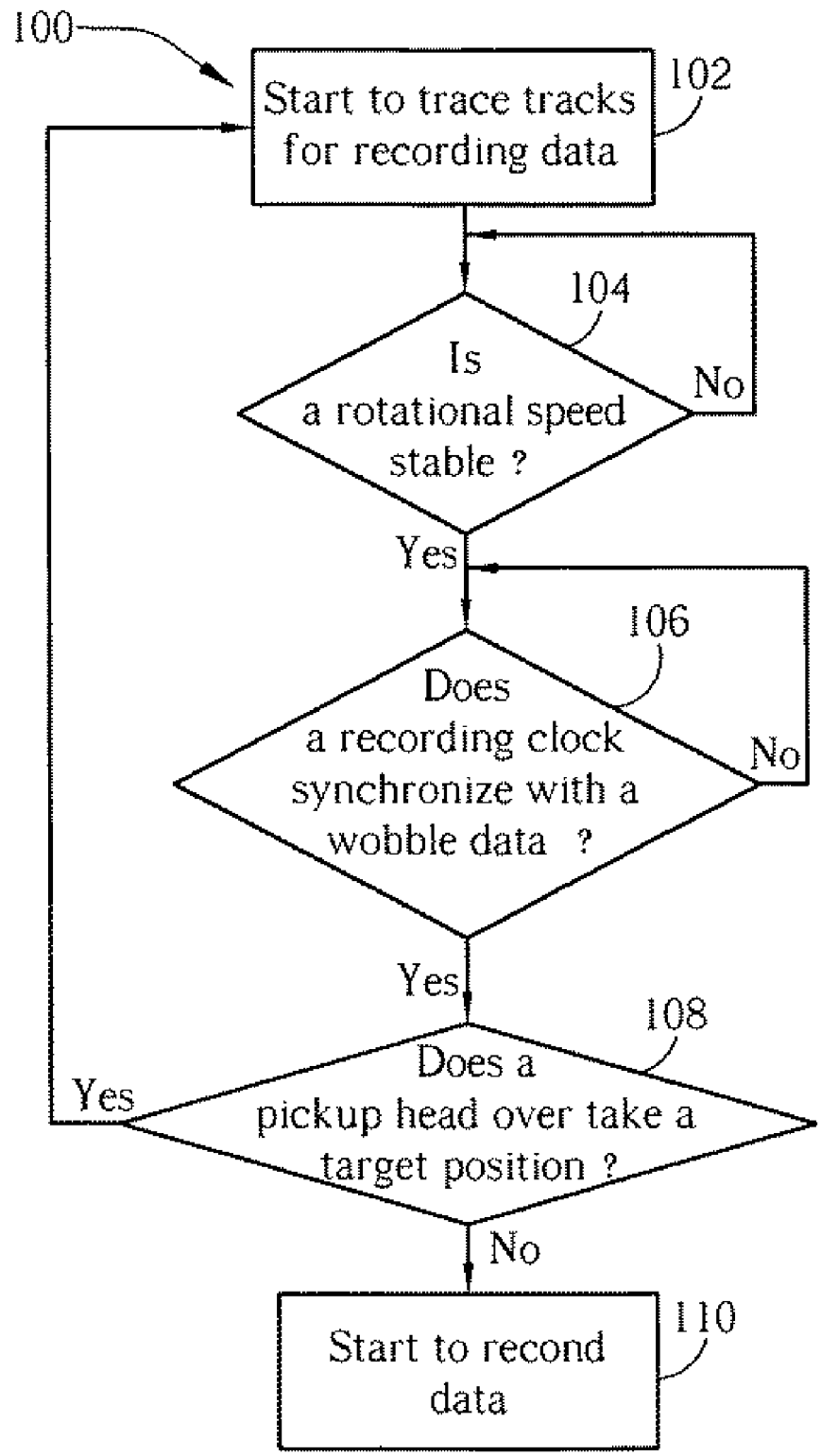
FIG. 4 is a flowchart of mechanical and electronic coordination before the optical disc drive shown in FIG. 1 starts to record data.
Figure 7:
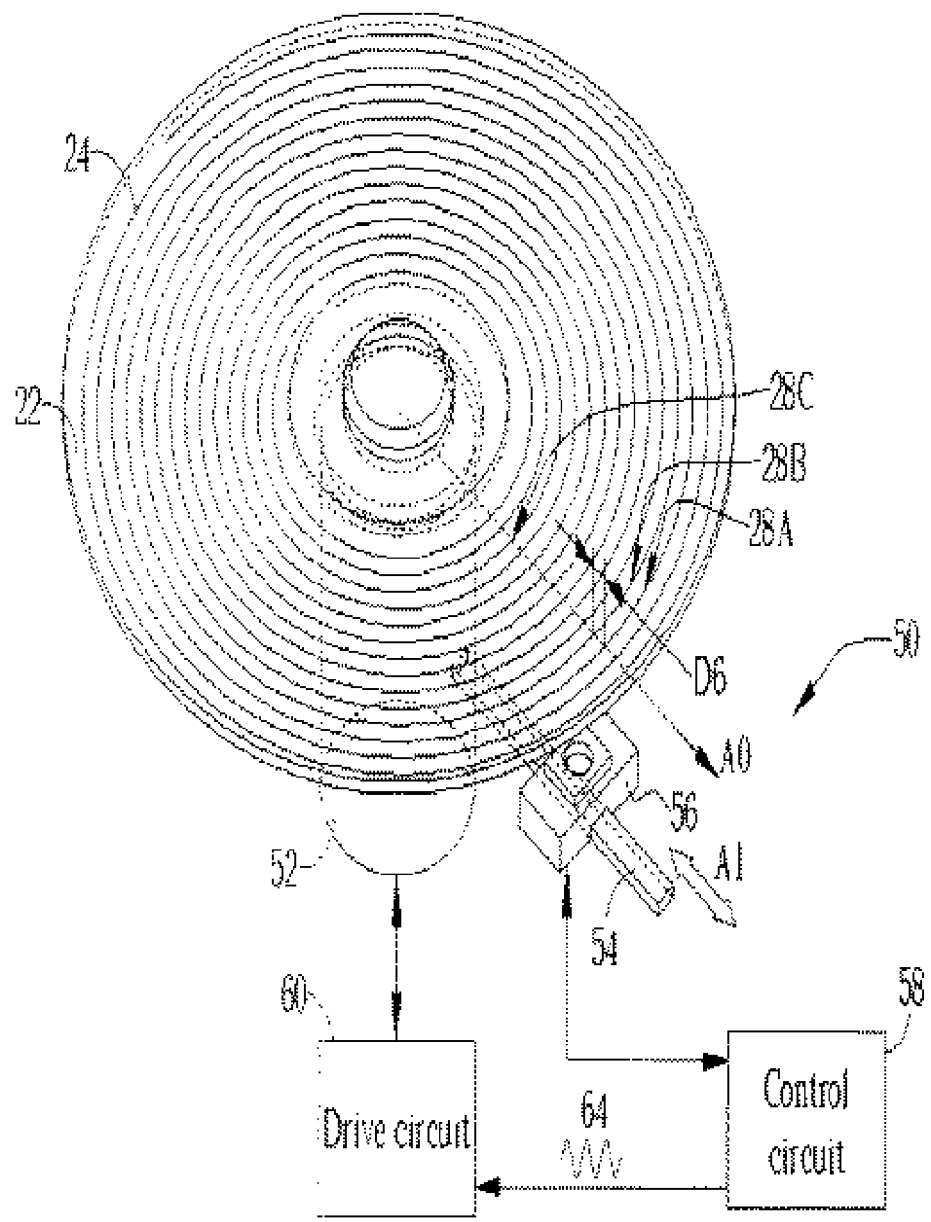
FIG. 7 is a functional diagram of an optical disc drive according to the present invention.

Please refer to FIG. 7. Being similar to the optical disc drive 10 of FIG. 1, an optical disc drive 50 of FIG. 7 comprises a motor 52 fixed inside the optical disc drive 50, a sliding track 54 fixed inside the optical disc drive 50, a pickup head 56 for accessing data on the optical disc 22, a drive circuit 60, and a control circuit 58. The motor 52 is used to drive the optical disc 22. The pickup head 56 is moveable along the sliding track 54 and can slide in both directions along an arrow A1 so as to access data on the track 24 of the optical disc 22. The control circuit 58 is used to control the optical disc drive 50, control the pickup head 56 to slide along the sliding track 54, receive the read data from the pickup head 54, and record data onto a track (ex. 28A) of the optical disc 22 with the pickup head 56 according to a recording clock. Further, the control circuit 58 outputs a drive signal 64 to the drive circuit 60 so as to control the rotational speed of the motor 52 through the drive circuit 60.

In contrast to the prior art, the present invention provides the optical disc drive 50 with a new procedure for mechanical and electronic coordination so as to solve the problems of the prior art.

Figure 8:
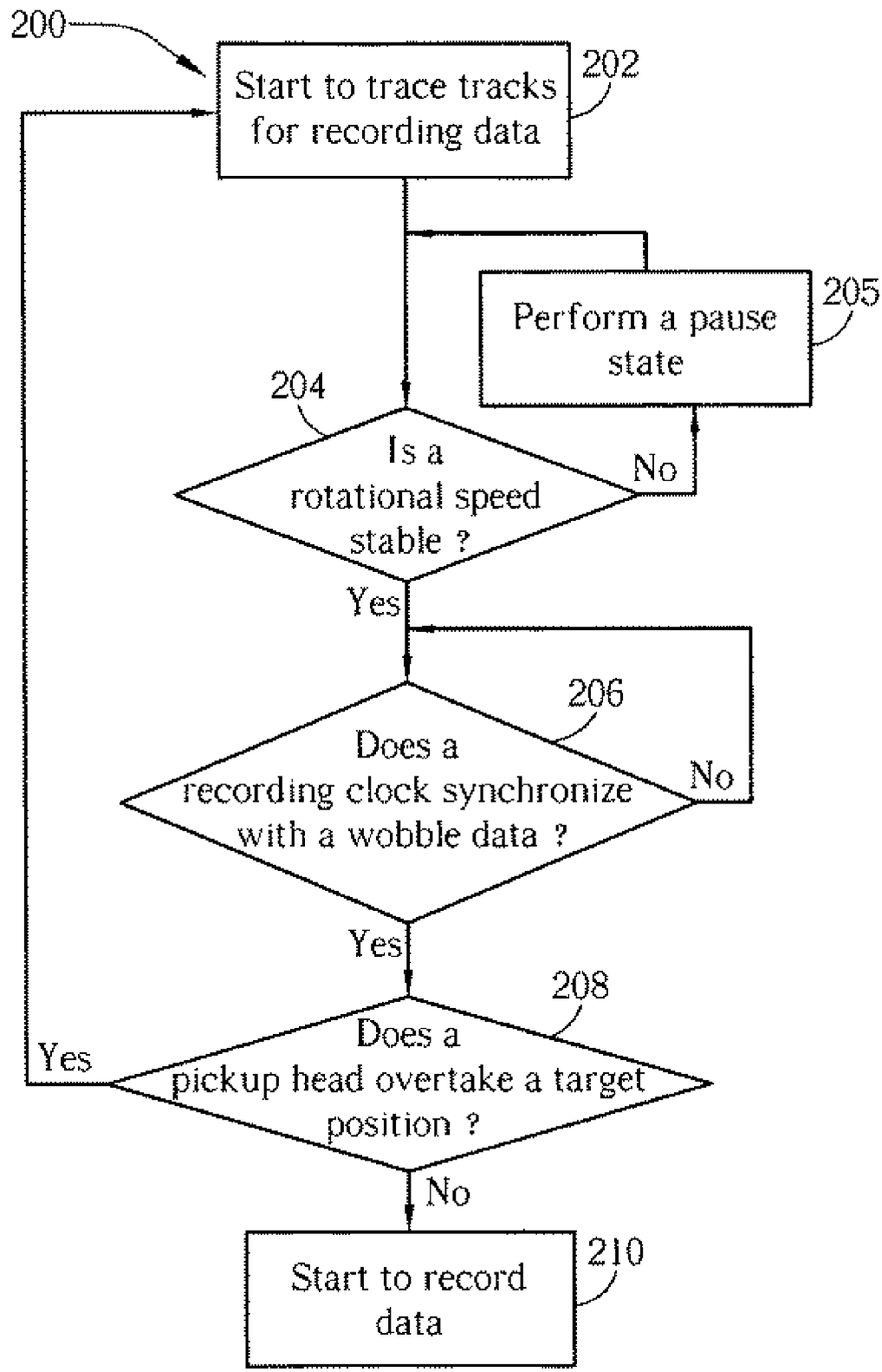
FIG. 8 is a flowchart of mechanical and electrical coordination before the optical disc drive shown in FIG. 7 starts to record data.

Refer to FIG. 8. FIG. 8 is a flowchart of mechanical and electrical coordination according to a procedure 200 of the present invention. The procedure 200 comprises:

Step 202: Start to trace tracks for recording data. Before a user controls the optical disc drive 50 to slide the optical pickup head 56 to a target position corresponding to a certain site on the optical disc 22 and record data onto the optical disc 22, they can pre-record test data onto the inner tracks of the optical disc.

Step 204: Start to adjust a rotational speed of the motor 52 according to a rotational speed corresponding to the track on where the certain site is located. While the motor 52 adjusts the rotational speed, the control circuit 18 monitors a stability of the rotational speed of the motor 52. If the rotational speed remains unstable, execute step 205 until the rotational speed becomes stable. When the rotational speed becomes stable, execute step 206.

Step 205: During the period when the rotational speed of the motor is adjusted, the pickup head 56 is controlled to slide back and forth within a predetermined recovering distance until the rotational speed of the motor 56 becomes stable. Step 205 is establishes a pause state. While an ordinary optical disc drive stops to display data on an optical disc for a moment, the pickup head slides back and forth within a track under the present invention pause state until the optical disc drive displays data on the optical disc. Further, according to the present invention, a predetermined time is used during step 205. When the pickup head 56 slides toward the target position from a beginning position for the predetermined time, the control circuit 58 compares a distance between the pickup head 56 and the beginning position with the predetermined recovering distance. If the distance between the pickup head 56 and the beginning position is longer than the recovering distance and the rotational speed of the motor 52 is not yet stable, slide the pickup head 56 opposite the direction of the target position so as to slide the pickup head back to approximately the beginning position. If the distance between the pickup head 56 and the beginning position is shorter than the recovering distance, the pickup head 56 continues to slide toward the target position even though the rotational speed of the motor 52 is not yet stable. As the predetermined time again elapses, again compare the distance between the pickup head 56 and the beginning position with the predetermined recovering distance. If the distance between the pickup head 56 and the beginning position is longer than the recovering distance and the rotational speed of the motor 52 is not yet stable, slide the pickup head 56 opposite the direction of the target position again so as to slide the pickup head back to the beginning position.

Step 206: After completing step 204, continue to slide the pickup head 56 toward the target position, meanwhile, synchronize the recording clock with the wobble data so as to synchronize the recording clock with the wobble data read from the optical disc 22. During step 206, the control circuit 58 detects if the recording clock remains synchronized with the wobble data. Before executing a step 208, repeat step 206 until the recording clock remains synchronized with the frame defined by the wobble data. According to the present invention, there is a predetermined distance before the target position, and step 206 is executed while the pickup head 56 slides for this predetermined distance.

Step 208: The pickup head 16 moves toward the target position while executing step 206. After completion of step 206, examine if the pickup head 56 overtakes the target position. If it does not, execute step 210, and if it does, return to step 202. As stated previously, because synchronizing only concerns the performance of the electronic apparatus when executing step 206, it is simple to predict the time for synchronizing during step 206. And, according to the present invention, the pickup head 56 remain sliding within the predetermined distance by performing the pause state while executing step 204. Therefore, after execution of steps 204 and 206, the pickup head 56 will not overtake the target position as the prior art does. However, the procedure 200 of the present invention can selectively execute step 208 to check if the position of the pickup head 56 has overtaken the target position after executing step 204 and 206 for the sake of insurance.

Step 210: Start to record data onto tracks of the optical disc 22 corresponding to the target position with the pickup head 56.

Figure 9:
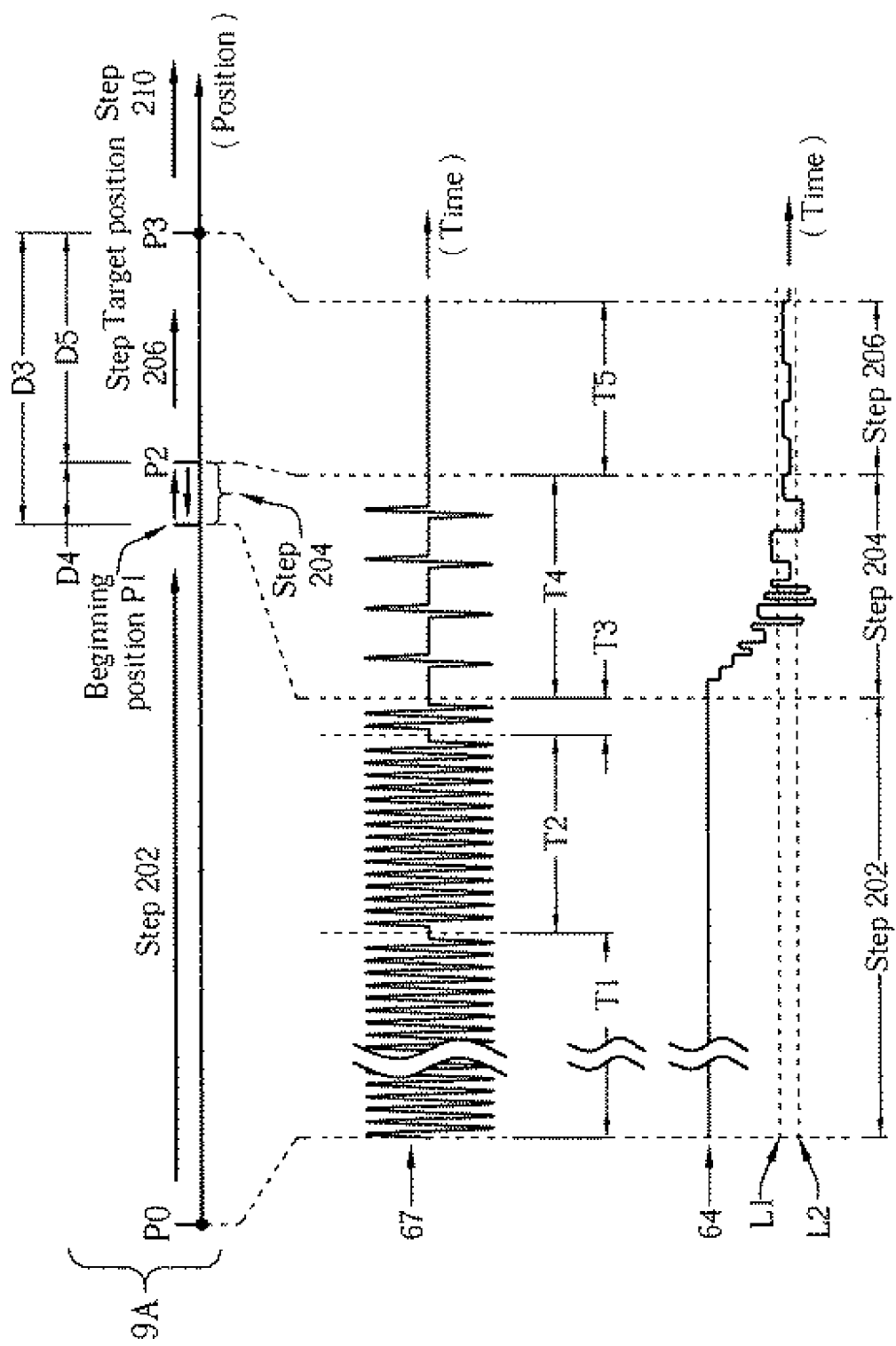
FIG. 9 is a diagram of pickup head positioning and sequence of related signals when performing steps shown in FIG. 8.

For more information on the above process, refer to FIG. 9. FIG. 9 is a diagram of positions of the pickup head 56 on the sliding track 54 and sequence of related signals when executing the procedure 200. Similar to FIG. 5, a wave pattern of tracking error 67 of FIG. 9 represents how many tracks the pickup head 56 crosses, and a wave pattern of drive signal 64 of FIG. 9 represents how stable the rotational speed of the motor 52 is. Further, a horizontal axis of the two wave patterns represents time, and a vertical axis of the two wave patterns represents intensity of signal. Region 9A of FIG. 9 shows the different positions of the pickup head 56 on the sliding track 54 at different times. Assuming the position of the pickup head 56 is P0 (a position corresponding to the track 28C of FIG. 7, for example.) when beginning to execute step 202, and the target position where to record data onto is P3 (a position corresponding to the track 28B of FIG. 7, for example.) According to the procedure 200, the optical disc drive 50 executes steps 204 and 206 when the pickup head 56 slides for a predetermined distance D3. In this case, the predetermined distance is D0. According to the target position P3 and the predetermined distance D3, the optical disc drive 50 determines a beginning position P1. During execution of step 202, the control circuit 58 controls the pickup head 56 to slide to the beginning position P1 while performing a long distance track crossing of a period T1, a short distance track crossing of a period T2, and a slight position adjustment of a period T3. After the pickup head 56 arrives at the beginning position P1, the optical disc drive 50 begins to execute step 204 and 206. When executing step 204, the optical pickup head 56 begins to adjust the rotational speed of the motor 56, meanwhile, the pickup head 56 slides back and forth between the beginning position P1 and a position P2, and the distance between P1 and P2 is a recovering distance D4. The recovering distance can be a track (for example, D6 of FIG. 7) or several tracks. During period T4 when executing step 204, the discontinuous wave pattern of tracking error 67 represents the pickup head 56 sliding from the position P2 to the beginning position P1 for the recovering distance D4. As the pickup head 56 slides from the beginning position P1 to the position P2, it slides along the track 24 smoothly and does not have to cross tracks, thus, the wave pattern of tracking error 67 becomes straight similar to the situation of the period Tp4 of FIG. 5. On the contrary, as the pickup head 56 slides from the position P2 to the beginning position P1, it crosses tracks, and thus, the wave pattern of tracking error 67 rises and falls. Further, because the pickup head 56 slides back and forth between the beginning position P1 and the position P2, the straight parts and the oscillating parts of the wave pattern of the tracking error 67 are interlaced, thus, the oscillating parts of the wave pattern of the tracking error 67 are discontinuous. According to FIG. 9, the position of the pickup head 56 remains between the beginning position P1 and the position P2 no matter how long it takes to execute step 204. Similar to the prior art, once the drive signal 64 remains between L1 and L2, the change of the rotational speed of the motor 56 is within a range of a tolerant value. After the rotational speed of the motor 56 becomes stable during the period T4, the control circuit 58 controls the pickup head 56 to stop sliding between the beginning position P1 and the position P2, and continue to slide toward the target position P3. While the pickup head 56 slides for a distance D5, the optical disc drive 50 begins to execute step 206 at the same time. After completing step 206 during a period T5, the pickup head 56 slides to the target position P3 and begins to execute step 210 to record data onto the optical disc 22.

Figure 5:
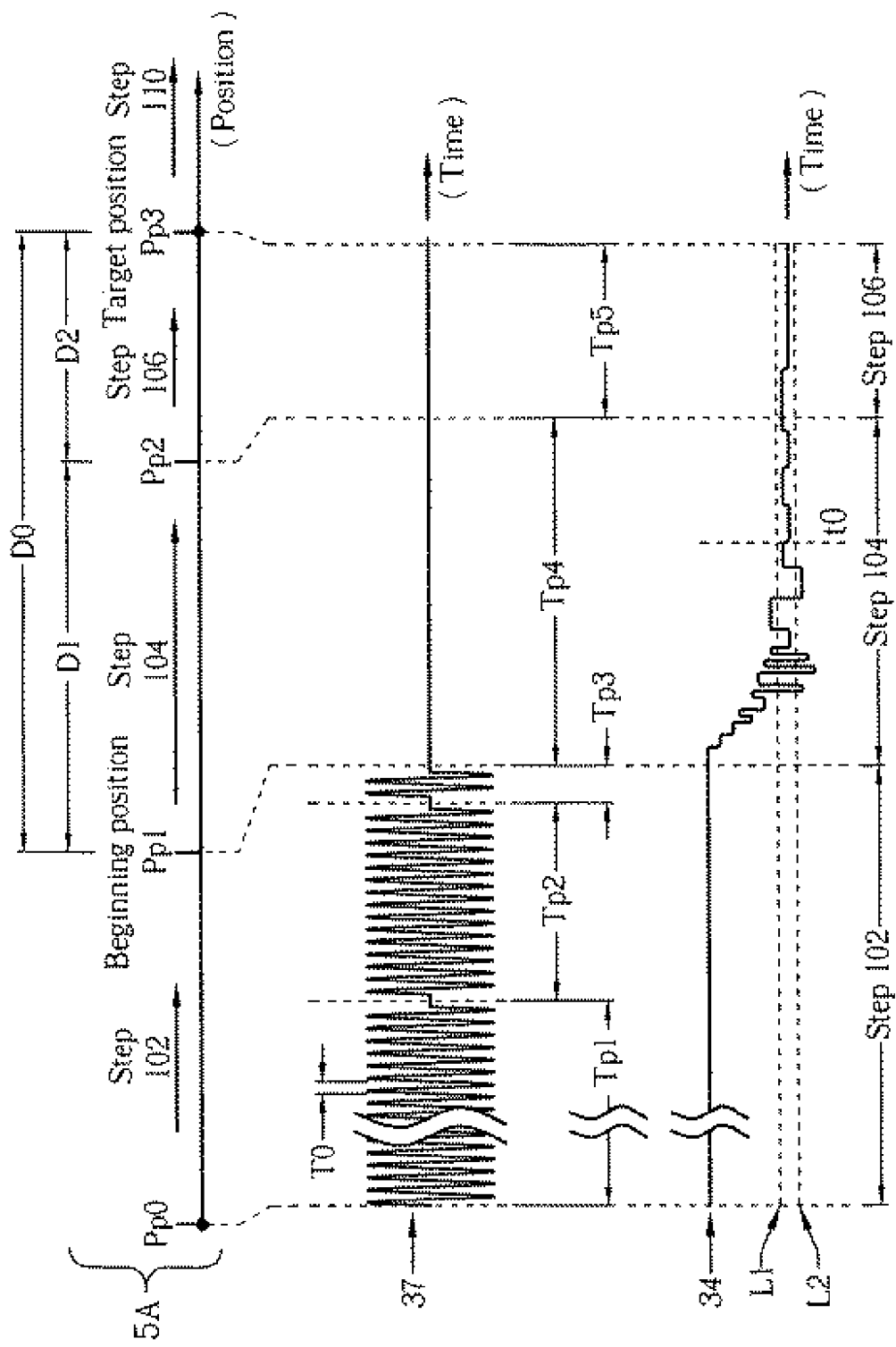
FIG. 5 and FIG. 6 are diagrams of pickup head positioning and sequence of related signals when executing steps shown in FIG. 4.
Figure 6:
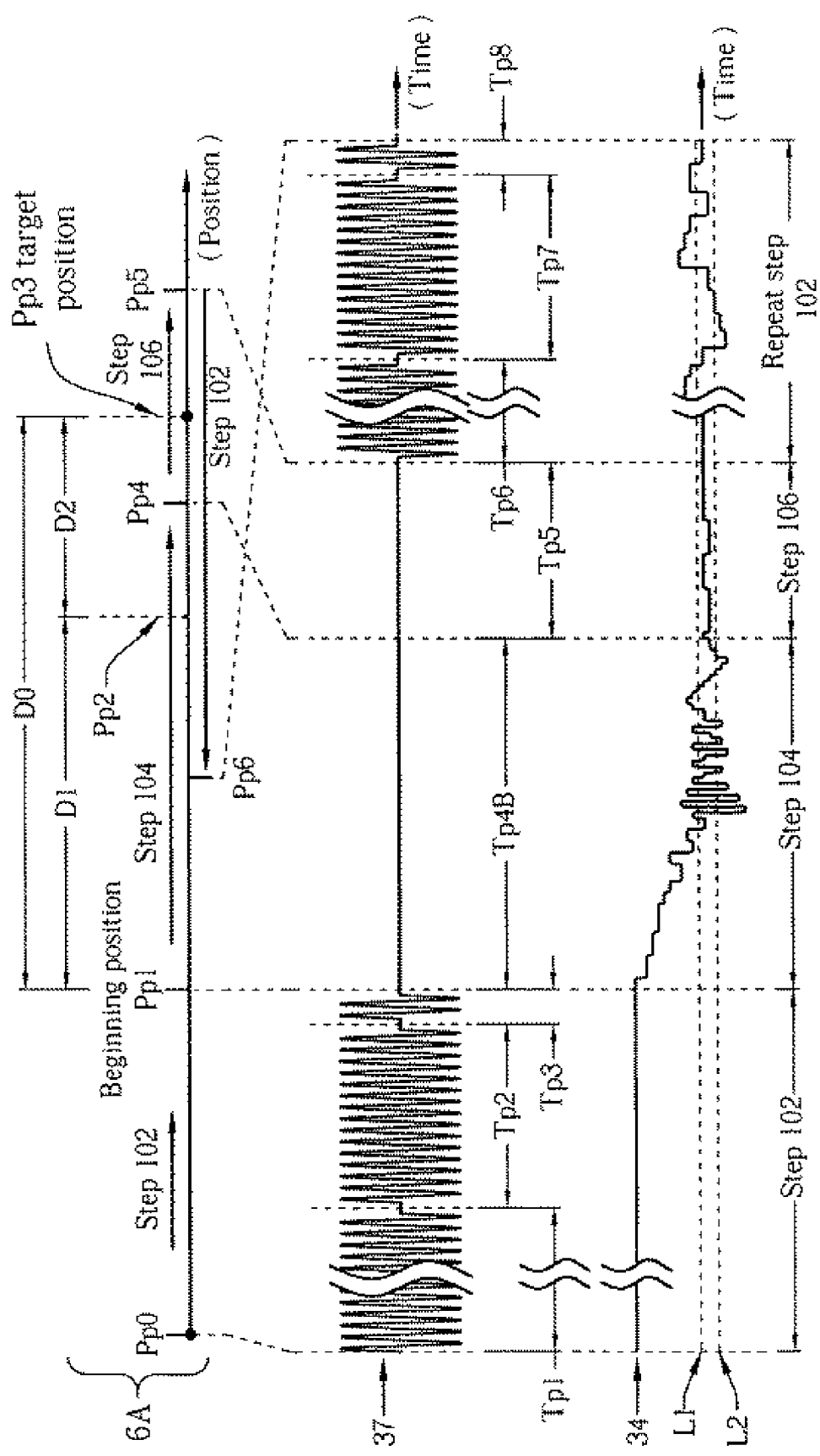

According to the prior art, because the pickup head remains sliding toward the target position as the optical disc drive adjusts the rotational speed of the motor, the pickup head needs to slide for the predetermined distance D1 when the optical disc drive adjusts the rotational speed of the motor (refer to FIG. 5 and FIG. 6 and the related description). However, the time for stabilizing the rotational speed of the motor varies substantially during step 104. As electronic apparatuses (ex. the control circuit) and mechanical apparatuses (ex. the motor) are mainly produced by different factories, it is difficult to predict and set the length of the predetermined distance D1. When the predetermined distance D1 is too long, the optical disc drive 50 wastes too much time on adjusting the rotational speed of the motor and synchronizing the recording clock with the wobble data. When the predetermined distance D1 is too short, the pickup head overtakes the target position as the rotational speed of the motor becomes stable, and wastes more time in re-execution of the procedure 100. Compared with the prior art, during the period when the optical disc drive 50 adjusts the rotational speed of the motor 52, the pickup head 56 slides back and forth within the range of the recovering distance. Therefore, it is totally unnecessary for the present invention to have a predetermined distance for adjusting the rotational speed of the motor. Furthermore, the optical disc drive 50 of the present invention can adapt the changes of the time for adjusting the rotational speed of the motor. If the actual time for adjusting the rotational speed of the motor is shorter, the frequency of the pickup head 56 sliding back and forth between the position P1 and the position P2 is less, and if the actual time for adjusting the rotational speed of the motor is longer, the frequency of the pickup head 56 sliding back and forth between the position P1 and the position P2 is higher. After completing step 204, the pickup head 56 can continue to slide toward the target position and execute step 206. And, because synchronizing only concerns the performance of the electronic apparatus when executing step 206, it is straightforward to predict an accurate time for synchronizing during step 206 and the length of the predetermined distance D5. Therefore, as the pickup head 56 slides for a predetermined distance D3 (D3=D4+D5), the optical disc drive 50 completes step 204 and 206 accurately, and the mechanical and electronic coordination is completed just before the pickup head 56 arrives at the target position. Compared with the prior art, the optical disc drive 50 of the present invention adapts the changes of the time for stabilizing the rotational speed of the motor, and thus, provides better performance and stability.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for accessing data by controlling an electro-optical system, the method comprising:
    determining if a difference between a rotational speed of a motor of the electro-optical system and a predetermined rotational speed is larger than a tolerant value when a pickup head of the electro-optical system slides toward a first direction and the rotational speed of the motor changes;
    sliding the pickup head for a recovery distance opposite the first direction if the difference value is larger than the tolerant value; and
    repeating the steps of sliding the pickup head toward the first direction, determining if the difference between the rotational speed of the motor and the predetermined rotational speed is larger than the tolerant value, and sliding the pickup head opposite the first direction when the difference value remains larger than the tolerant value until the difference value is less than the tolerant value.

2. The method of claim 1 wherein the optical disc records data and is divided into a plurality of tracks along the direction of a sliding track, and the recovery distance is the distance from a first track to a nearest other track.

3. The method of claim 1 wherein the optical disc has a data track for recording data along discontinuous spreading recording marks, and a wobble track for recording wobble data along a continuous spreading pre-groove of the data track, and the electro-optical system records data onto the optical disc according to a reading clock, the method further comprising:
    constantly sliding the pickup head toward the first direction if the difference value is less than the tolerant value after executing the comparison step; and
    adjusting a frequency of the reading clock according to the wobble data so as to synchronize the reading clock with the wobble data.

4. The method of claim 1 wherein the optical disc is divided into a plurality of data recording tracks along the sliding track, each track corresponding to an access rotational speed, and the pickup head is moved from a first position to a different second position toward the first direction, and the rotational speed of the motor changes from an access rotational speed corresponding to the first position to an access rotational speed corresponding to the second position when the pickup head slides toward the first direction and the rotational speed of the motor changes.

5. The method of claim 1 wherein the determining step is executed while the rotational speed of the motor is changing after the pickup head has slid toward the first direction from a first position for a predetermined time period.

6. A method for accessing data by controlling an electro-optical system operating with constant linear velocity, the method comprising:
    comparing a rotational speed of a motor of the electro-optical system with a predetermined rotational speed to determine if a difference value between the rotational speed of the motor and the predetermined rotational speed is larger than a tolerant value when a pickup head of the electro-optical system slides toward a first direction and the rotational speed of the motor changes;
    sliding the pickup head for a recovery distance opposite the first direction if the difference value is larger than the tolerant value;
    repeating the steps of sliding the pickup head toward the first direction, comparing the rotational speed of the motor with the predetermined rotational speed, and sliding the pickup head opposite the first direction when the difference value remains larger than the tolerant value until the difference value is less than the tolerant value; and
    adjusting a frequency of a reading clock of the electro-optical system to synchronize the reading clock with wobble data.

7. The method of claim 6 wherein the optical disc records data and is divided into a plurality of tracks along the direction of the sliding track, and the recovery distance is the distance from a first track to a nearest other track.

8. The method of claim 6 wherein the optical disc has a data track for recording data along discontinuous spreading recording marks, and a wobble track for recording wobble data along a continuous spreading pre-groove of the data track, and the electro-optical system records data onto the optical disc according to the reading clock, wherein the frequency of the reading clock is adjusted according to the wobble data.

9. The method of claim 6 wherein the optical disc is divided into a plurality of data recording tracks along the sliding track, each track corresponding to an access rotational speed, the pickup head is moved from a first position to a different second position toward the first direction, and the rotational speed of the motor changes from an access rotational speed corresponding to the first position to an access rotational speed corresponding to the second position when the pickup head slides toward the first direction and the rotational speed of the motor changes.

10. The method of claim 6 wherein the comparison step is executed while the rotational speed of the motor is changing after the pickup head has slid toward the first direction from a first position for a predetermined time period.

11. A control circuit for accessing data by controlling an electro-optical system, the control circuit comprising:
    a motor for driving an optical disc; and
    a pickup head linearly moveable along a sliding track fixed to the electro-optical system for accessing data on the optical disc wherein the control circuit executes a comparison step to determine if a difference value between a rotational speed of the motor and a predetermined rotational speed is larger than a tolerant value when the rotational speed of the motor changes and the pickup head slides toward a first direction, and the control circuit slides the pickup head opposite the first direction for a recovery distance if the difference value is larger than the tolerant value, and then slides the pickup head toward the first direction repeatedly until the difference value is less than the tolerant value.

12. The control circuit of claim 11 wherein the optical disc records data and is divided into a plurality of tracks along the direction of the sliding track, and the recovery distance is the distance from a first track to a nearest other track.

13. The control circuit of claim 11 wherein the optical disc has a data track for recording data along discontinuous spreading recording marks, and a wobble track for recording wobble data along a continuous spreading pre-groove of the data track, and the electro-optical system records data onto the optical disc according to a reading clock, wherein if the difference value is less than the tolerant value after the control circuit executes the comparison step, the control circuit constantly slides the pickup head toward the first direction and starts to adjust a frequency of the reading clock according to the wobble data so as to synchronize the reading clock with the wobble data.

14. The control circuit of claim 11 wherein the optical disc is divided into a plurality of data recording tracks along the sliding track, each track corresponding to an access rotational speed, the pickup head is moved from a first position to a different second position toward the first direction, and the rotational speed of the motor changes from an access rotational speed corresponding to the first position to an access rotational speed corresponding to the second position when the rotational speed of the motor is changing and the pickup head slides toward the first direction.

15. The control circuit of claim 14 wherein the pickup head accesses the data on a track when the pickup head is moved along the sliding track to a position corresponding to the track, and the difference value between the rotational speed of the motor and an access rotational speed corresponding to the track is less than the tolerant value.

16. The control circuit of claim 11 wherein the control circuit executes the comparison step while the rotational speed of the motor is changing after the pickup head has slid toward the first direction from a first position for a predetermined time period.

* * * * *